United States Patent
Tilly

(10) Patent No.: US 10,318,921 B1
(45) Date of Patent: Jun. 11, 2019

(54) FORECASTING RETURNS FOR RETAIL DEMAND PLANNING

(71) Applicant: JDA Software Group, Inc., Scottsdale, AZ (US)

(72) Inventor: Philippe Jean-Marc Tilly, Scottsdale, AZ (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 15/868,540

(22) Filed: Jan. 11, 2018

Related U.S. Application Data

(60) Provisional application No. 62/445,609, filed on Jan. 12, 2017.

(51) Int. Cl.
  *G06Q 10/08* (2012.01)
  *G06Q 20/20* (2012.01)
  *G06Q 30/02* (2012.01)

(52) U.S. Cl.
  CPC ......... *G06Q 10/087* (2013.01); *G06Q 20/203* (2013.01); *G06Q 20/208* (2013.01); *G06Q 30/0202* (2013.01)

(58) Field of Classification Search
  CPC ...................................................... G06Q 10/06
  USPC ......................................................... 705/28
  See application file for complete search history.

(56) References Cited

U.S. PATENT DOCUMENTS

2014/0278713 A1\* 9/2014 Zivelin ............ G06Q 10/06313
                                                                    705/7.25

OTHER PUBLICATIONS

Forecasting the returns in reusable containers' closed-loop supply chains. A case in the Liquefied Petroleum Gases Industry, Carrasco-Gallego, Ponce-Cueto, 3rd International Conference on Industrial Engineering, Sep. 2-4, 2009, pp. 311-320.
Managing Product Returns: The Role of Forecasting, Technology Management, INSEAD, Econometric Institute Report EI Nov. 2003, Beril Toktay, Mar. 2003, pp. 1-27.
Forecasting Product Returns, Technology Management, INSEAD, Beril Toktay, 2000, pp. 1-22.

\* cited by examiner

*Primary Examiner* — Russell S Glass
(74) *Attorney, Agent, or Firm* — Spencer Fane LLP; Steven J. Laureanti

(57) ABSTRACT

A system and method are disclosed for returns forecasting for a retail store inventory of one or more supply chain entities. Embodiments include receiving a current state of items in a supply chain network, receiving a sales time series and a returns time series, computing a returns forecast comprising an expected quantity of a particular product to be returned for a future time period using a sales forecast a and a transfer function estimated from the sales time series and the returns time series.

20 Claims, 6 Drawing Sheets

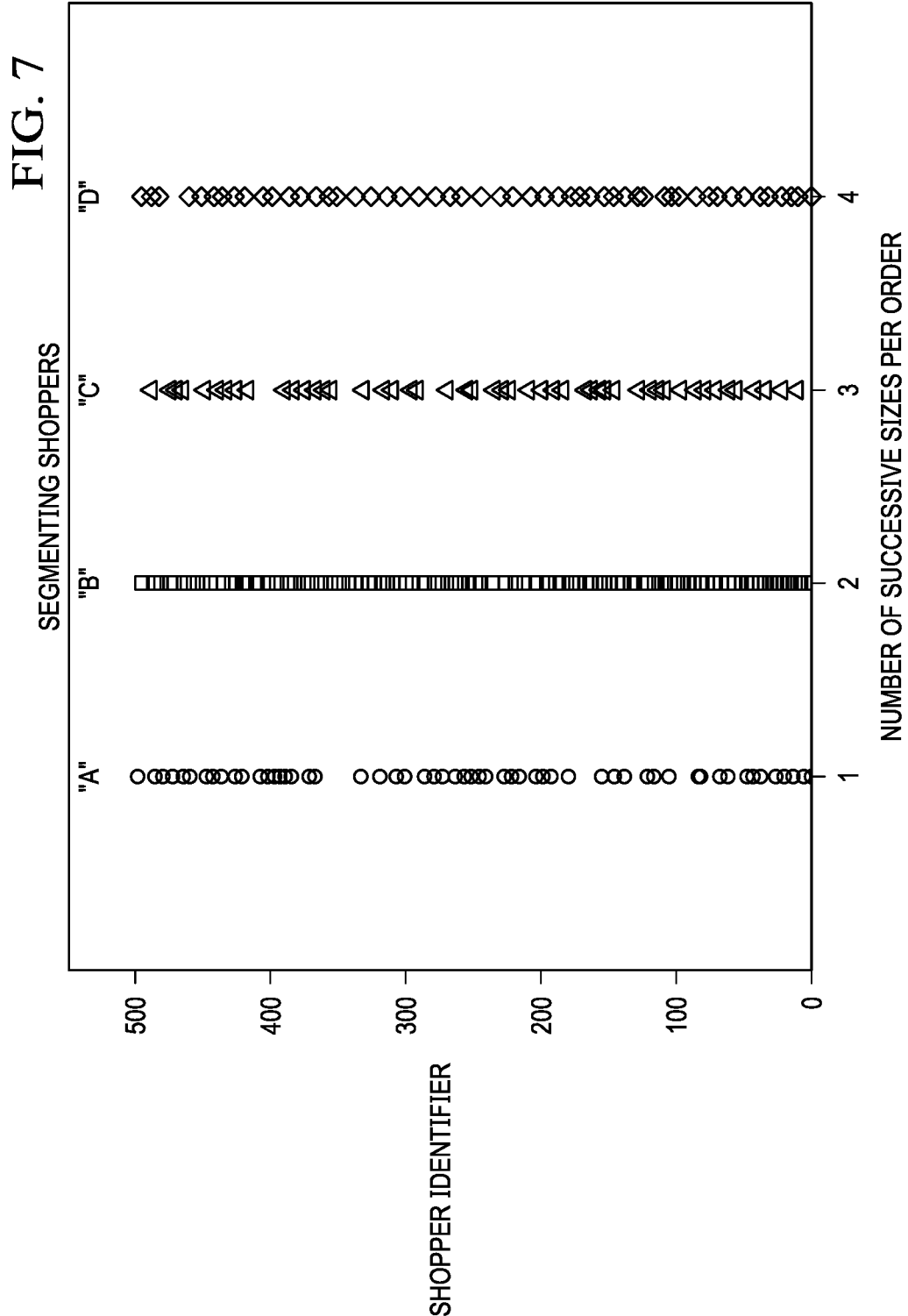

FORECASTING RETURNS FOR RETAIL DEMAND PLANNING

CROSS-REFERENCE TO RELATED APPLICATIONS

The present disclosure is related to that disclosed in the U.S. Provisional Application No. 62/445,609, filed Jan. 12, 2017, entitled "Forecasting Returns for Retail Demand Planning." U.S. Provisional Application No. 62/445,609 is assigned to the assignee of the present application. The subject matter disclosed in U.S. Provisional Application No. 62/445,609 is hereby incorporated by reference into the present disclosure as if fully set forth herein. The present invention hereby claims priority under 35 U.S.C. § 119(e) to U.S. Provisional Application No. 62/445,609.

TECHNICAL FIELD

The present disclosure relates generally to demand planning and specifically to forecasting returns for retail demand planning.

BACKGROUND

A significant portion of the items sold by a retailer are returned to their stores. A typical brick and mortar store can often expect 8-10% of the items it sells to be returned, while an online store may see returns of nearly 40%. Traditionally, retailers approach this problem by projecting future returns based directly on past returns. However, this and other approaches usually fail to accurately predict the quantity and timing of future returned items, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates a chart of four exemplary shopper segments, segmented according to the number of successive sizes per order.

DETAILED DESCRIPTION

Figure 1:
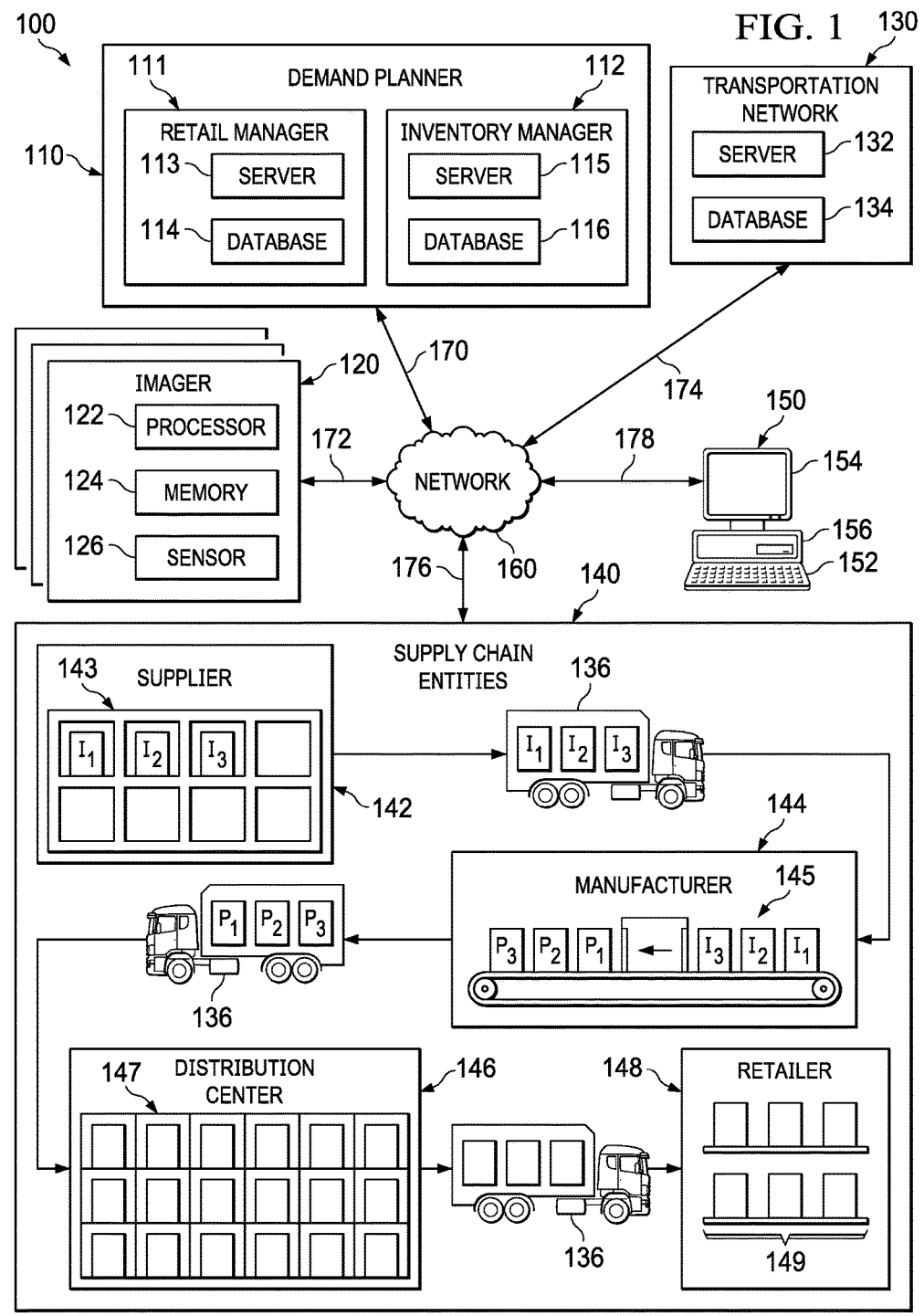
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Retailers often cannot accurately predict the timing or quantity of returned items using a forecast based solely on past returns. However, accurately forecasting returns is key for retailers to assess the amount of labor needed to process returned items and align fulfillments with projected inventory. Aspects of the current disclosure comprise a system and method to forecast an amount and a timing of returned items based, at least in part, on historical sales, historical returns, and a sales forecast by modeling and computing a transfer function. According to embodiments, a retail manager leverages existing sales forecast capability to predict future returns from an adaptive estimation of a transfer function that models returns from sales. As described in more detail below, aspects of the current disclosure include handling seasonal and non-seasonal returned items at the demand forecasting unit (DFU) level, predicting labor and fulfillment requirements, generating forecasts based on product aggregation and customer segmentation, and adapting to changing return dynamics and patterns. These embodiments allow supply chain planners to better forecast the amount and timing of returned items, which allow supply chain planners to adjust inventory to match customer demand (such as, for example, by reselling the returned items) and adjust on-site labor (who may inspect, repackage, and reprice returned items). The savings to the retailer include: transporting less goods, reduced inventory costs, using less packaging, eliminating extensive reverse logistics, and more accurately forecasting labor requirements.

As discussed below, embodiments of the current disclosure comprise a transfer function which is estimated using a normalized Least Mean Squared (nLMS) algorithm. Additionally, aspects of the disclosed embodiments include adaptively updating the transfer function with current sales and returns data to refine the returns forecast and reflect changes in the retail market, such as, for example, new sales policies, defective products, and the like.

FIG. 1 illustrates an exemplary supply chain network 100 according to a first embodiment. Supply chain network 100 comprises demand planner 110, one or more imagers 120, transportation 130, one or more supply chain entities 140, computer 150, network 160, and communication links 170-178. Although a single demand planner 110, a single imager 120, a single transportation network 130, one or more supply chain entities 140, a single computer 150, and a single network 160, are shown and described, embodiments contemplate any number of demand planners, imagers, transportation systems, supply chain entities, computers, or networks, according to particular needs. In addition, or as an alternative, although demand planner 110 is shown and described as separate from one or more supply chain entities 140, embodiments contemplate demand planner 110 being integral with one or more supply chain entities 140.

In one embodiment, demand planner 110 comprises retail manager 111 and inventory manager 112. Retail manager 111 comprises server 113 and database 114. As described in more detail below, retail manager 111 receives sales and returns transaction data, models a transfer function, and generates a returns forecast for one or more products in supply chain network 100. Inventory manager 112 comprises server 115 and database 116. As described in more detail below, inventory manager 112 is configured to receive and transmit item identifiers, pricing data, attribute data, inventory levels, and other like data about one or more items at one or more locations in the supply chain network 100.

According to embodiments, one or more imagers 120 comprise one or more processors 132, memory 134, one or more sensors 136, and may include any suitable input device, output device, fixed or removable computer-readable storage media, or the like. Additionally, one or more imagers 120 may receive imaging information from one or more sensors 136 or from one or more databases, in supply chain network 100. According to embodiments, one or more imagers 120 identify items near one or more sensors 136 and generate a mapping of the item in supply chain network 100. As explained in more detail below, transportation network 130 and inventory manager 112 use the mapping of an item to locate the item in supply chain network 100. The location of the item is then used to coordinate the storage and transportation of items in supply chain network 100.

One or more imagers 120 may comprise a mobile handheld device such as, for example, a smartphone, a tablet computer, a wireless device, or the like. In addition, or as an alternative, one or more imagers 120 comprise one or more networked imagers, such as a point-of-sale system (POS) configured to transmit item identity information to one or more databases as an item passes by or is scanned by sensor 136 of one or more imagers 120. This may include, for example, a stationary scanner located at one or more supply chain entities 140 that identifies items as the items pass near the scanner or a mobile scanner located at one or more supply chain entities 140 that identifies items as the mobile scanner passes by one or more items, such as, for example, a mobile robotic scanner which scans items on store shelves or products in a warehouse. One or more sensors 136 of one or more imagers 120 may comprise an imaging sensor, such as, a camera, scanner, electronic eye, photodiode, charged coupled device (CCD), or other like sensor that visually detects objects. In addition, or as an alternative, one or more sensors 136 may comprise a radio receiver and/or transmitter configured to read an electronic tag, such as, for example, a radio-frequency identification (RFID) tag. Each of the one or more items may be represented in supply chain network 100 by an identifier, including, for example, Stock-Keeping Unit (SKU), Universal Product Code (UPC), serial number, barcode, tag, RFID, or any other object that encodes identifying information. One or more imagers 120 may generate a mapping of one or more items in the supply chain network 100 by scanning an identifier or object associated with an item using sensor 136 and identifying the item based, at least in part, on the scan.

Transportation network 130 comprises server 142 and database 144. According to embodiments, transportation network 130 directs one or more transportation vehicles 146 to ship one or more items between one or more supply chain entities 140, based, at least in part, on a returns forecast determined by the one or more demand planners 110, mappings of one or more items in the supply chain networks, characteristics of one or more customer segments, and/or one or more other factors described herein. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication that communicates location information (such as, for example, geographic coordinates, distance from a location, global positioning satellite (GPS) information, or the like) with demand planner 110, one or more imagers 120, transportation network 130, and/or one or more supply chain entities 140 to identify the location of the transportation vehicle 136 and the location of any inventory or shipment located on the transportation vehicle 136. In addition to the supply chain models, the number of items shipped by transportation vehicles 136 in transportation network 130 may also be based, at least in part, on the number of items currently in stock at one or more supply chain entities 140, the number of items currently in transit in the transportation network 130, a forecasted demand, a supply chain disruption, a returns forecast, and the like.

As shown in FIG. 1, supply chain network 100 operates on one or more computers 150 that are integral to or separate from the hardware and/or software that support demand planner 110, one or more imagers 120, transportation network 130, and one or more supply chain entities 140. Supply chain network 100 comprising demand planner 110, one or more imagers 120, transportation network 130, and one or more supply chain entities 140 may operate on one or more computers that are integral to or separate from the hardware and/or software that support demand planner 110, one or more imagers 120, transportation network 130, and one or more supply chain entities 140. Computers 150 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification, or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more imagers 120 may be emulated by one or more modules configured to perform the functions and methods as described.

In addition, and as discussed herein, supply chain network 100 may comprise a cloud-based computing system having processing and storage devices at one or more locations, local to, or remote from demand planner 110, one or more imagers 120, transportation network 130, and one or more supply chain entities 140. In addition, each of the one or more computers 150 may be a work station, personal computer (PC), network computer, notebook computer, tablet, personal digital assistant (PDA), cell phone, telephone, smartphone, wireless data port, POS, augmented or virtual reality headset, or any other suitable computing device. In an embodiment, one or more users may be associated with the demand planner 110, one or more imagers 120, transportation network 130, and one or more supply chain entities 140.

In an embodiment, one or more users may be associated with demand planner 110, retail manager 111, and/or inventory manager 112. These one or more users may include, for example, a "manager" or a "planner" handling sales forecasting, returns forecasting, inventory management, and/or one or more related tasks within the system. In addition, or as an alternative, these one or more users within the system may include, for example, one or more computers 150 programmed to autonomously handle, among other things, sales forecasting, returns forecasting, inventory management, order fulfillment, controlling manufacturing equipment, adjusting various levels of manufacturing and inventory levels at various stocking points and distribution centers, and/or one or more related tasks within supply chain network 100.

One or more supply chain entities 140 represent one or more supply chain networks, including one or more enterprises, such as, for example networks of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Items may comprise, for example, parts or supplies used to generate products. According to some embodiments, items comprise foods or ingredients. Suppliers 142 may comprise automated distribution systems 143 that automatically transport products to one or more manufacturers 144 based, at least in part, on a returns forecast determined by the one or more demand planners 110, mappings of one or more items in the supply chain networks, characteristics of one or more customer segments, and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on a returns forecast determined by the one or more demand planners 110, mappings of one or more items in the supply chain networks, characteristics of one or more customer segments, and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on a returns forecast determined by the one or more demand planners 110, mappings of one or more items in the supply chain networks, characteristics of one or more customer segments, and/or one or more other factors described herein.

Retailers 148 may be any suitable entity that obtains one or more products to sell to one or more customers. Retailers 148 may (like the other one or more supply chain entities 140), comprise a corporate structure having a retail headquarters and one or more retail stores. Retail headquarters comprises a central planning office with oversight of one or more retail stores. Retail stores may comprise any online or brick-and-mortar store, including stores with shelving systems 149. The one or more retail stores of retailer 148 may sell products according to rules, strategies, orders, and/or guidelines developed by one or more retail headquarters. For example, retail headquarters may create planograms and instruction sets that determine how the store will shelve or display one or more products. Although planogram execution may be performed by a retail employee, embodiments contemplate automated configuration of shelving and retail displays. This may include, for example, automated robotic shelving machinery that places products on shelves or automated shelving that automatically adjusts based, at least in part, on a returns forecast determined by the one or more demand planners 110, mappings of one or more items in the supply chain networks, characteristics of one or more customer segments, and/or one or more other factors described herein. Shelving systems 149 may comprise, for example, various racks, fixtures, brackets, notches, grooves, slots, or other attachment devices for fixing shelves in various configurations.

According to embodiments, one or more supply chain entities 140 comprise a reverse logistics pathway to receive and process returned items from one or more customers. According to embodiments, items may be returned to the one or more supply chain entities 140 by one or more customers or any of the one or more supply chain entities 140 based on, for example, a customer return, a defective product, a recalled product, incorrect shipment or size, and the like. In response to the one or more supply chain entities 140 receiving the returned item, transportation vehicles 136 may transport the one or more items from a first of the one or more supply chain entity 140, such as, for example, retailer 148 to a second of the one or more supply chain entity 140, such as, for example, supplier 142, manufacturer 144, distribution center 146, or another retailer 148, including for sale on a secondary market by a third party retailer. As described in more detail below, one or more imagers 120 or POS systems 202-204 (FIG. 2) may track the location, identity, and other transaction data of the one or more returned items to generate mapping of the item location in supply chain network 100.

Although one or more supply chain entities 140 are shown and described as separate and distinct entities, the same entity may simultaneously act as more than one of the one or more supply chain entities 140. For example, one or more supply chain entities 140 acting as a manufacturer can produce a product, and the same one or more supply chain entities 140 can act as a supplier to supply an item to itself or another one or more supply chain entities 140 or receive a return of an item to itself or another one or more supply chain entities 140. Although one example of a supply chain network 100 is shown and described, embodiments contemplate any configuration of supply chain network 100, without departing from the scope described herein.

In one embodiment, demand planner 110 may be coupled with network 160 using communications link 170, which may be any wireline, wireless, or other link suitable to support data communications between demand planner 110 and network 160 during operation of supply chain network 100. One or more imagers 120 are coupled with network 160 using communications link 172, which may be any wireline, wireless, or other link suitable to support data communications between one or more imagers 120 and network 160 during operation of distributed supply chain network 100. Transportation network 130 may be coupled with network 160 using communications link 174, which may be any wireline, wireless, or other link suitable to support data communications between transportation network 130 and network 160 during operation of supply chain network 100. One or more supply chain entities 140 may be coupled with network 160 using communications link 176, which may be any wireline, wireless, or other link suitable to support data communications between one or more supply chain entities 140 and network 160 during operation of supply chain network 100. Computer 150 may be coupled with network 160 using communications link 178, which may be any wireline, wireless, or other link suitable to support data communications between computer 160 and network 160 during operation of supply chain network 100.

Although communication links 170-178 are shown as generally coupling one or demand planner 110, one or more imagers 120, transportation network 130, one or more supply chain entities 140, and computer 150 to network 160, any of demand planner 110, one or more imagers 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling demand planner 110, one or more imagers 120, transportation network 130, one or more supply chain entities 140, and computer 150. For example, data may be maintained locally to, or externally of demand planner 110, one or more imagers 120, transportation network 130, one or more supply chain entities 140, and computer 150 and made available to one or more associated users of demand planner 110, one or more imagers 120, transportation network 130, one or more supply chain entities 140, and computer 150 using network 160 or in any other appropriate manner. For example, data may be maintained in a cloud database at one or more locations external to demand planner 110, one or more imagers 120, transportation network 130, one or more supply chain entities 140, and computer 150 and made available to one or more associated users of demand planner 110, one or more imagers 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, demand planner 110 may forecast the quantity and timing of returned items (returns forecast) at retailer 148 or another supply chain entity 140 in supply chain network 100. Furthermore, demand planner 110 may instruct automated machinery (i.e., robotic warehouse systems, robotic inventory managers, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 140, and the configuration and quantity of packaging and shipping of items based on one or more generated returns forecasts, current inventory, and/or production levels.

For example, the methods described herein may include computers 150 receiving product data from automated machinery having at least one sensor 126 and the product data corresponding to an item detected by one or more imagers 120 of the automated machinery. The received product data may include an image of the item, an identifier, as described above, and/or attributes associated with the item (dimensions, texture, estimated weight, and any other like data). The method may further include computers 150 automatically looking up received product data in a database system associated with demand planner 110, one or more imagers 120, and/or transportation network 130 to identify the item corresponding to the product data received from the automated machinery.

The computers may also receive, from the automated machinery, a current location of the identified item. Based on the identification of the item, computers 150 may also identify (or alternatively generate) a first mapping in the database system, where the first mapping is associated with the current location of the item. Computers 150 may also identify a second mapping in the database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, as least in part, on one or more differences between the first mapping and the second mapping such as, for example, to locate an item to add to or remove from a shelf or inventory of one or more supply chain entities 140 or a shipment to or from one or more supply chain entities 140.

In accordance with the principles of embodiments described herein, retail manager 111 of demand planner 110 estimates and/or computes a sales forecast, a returns forecast, and a transfer function, places orders for the one or more products, determines if the one or more products should be a purchased by a particular retailer, segments customers based on buying or returns habits, and the like. In addition, or as an alternative, retail manager 111 monitors the sales, inventory, and returns of the one or more products over a given period of time, and adjusts the inventory of retailer 148 and/or one or more supply chain entities 140 based, at least in part, on returns, inventory, and retail constraints.

Based, at least in part, on the forecasted sales and returns, retail manager 111 then causes one or more supply chain entities 140 to produce, supply, hold, and/or limit supply to an amount of items equal to the calculated future sales of the items minus any on-hand inventory and any resalable returned items at one or more retailers 148. Although retail manager 111 is described as computing a returns forecast for one or more items, retail manager 111 may also compute the returns forecast for or one or more collection of items or grouping of one or more items, according to particular needs.

Figure 2:
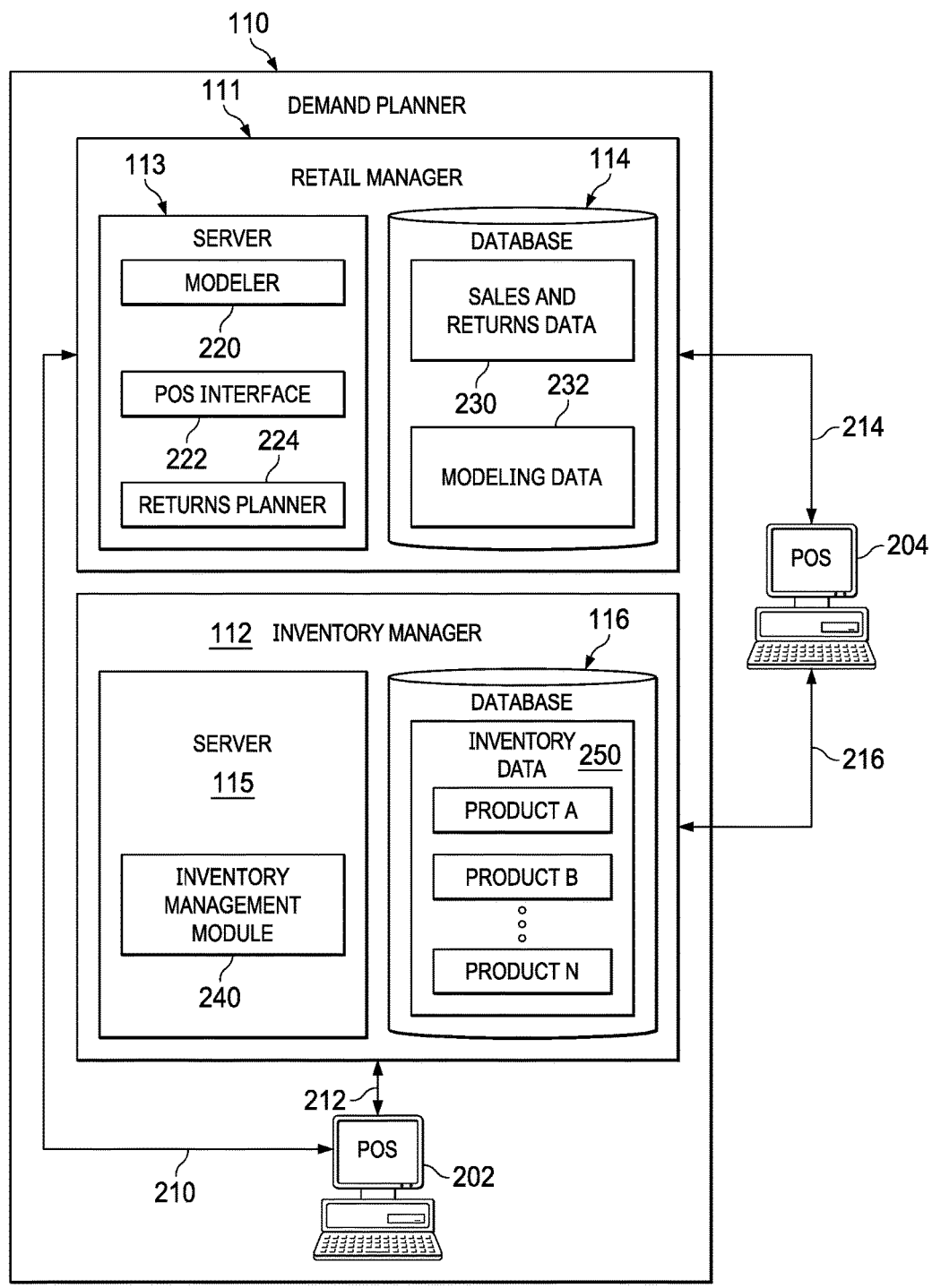
FIG. 2 illustrates the demand planner of FIG. 1 in greater detail in accordance with the first embodiment.

FIG. 2 illustrates demand planner 110 of FIG. 1 in greater detail in accordance with the first embodiment. According to embodiments, demand planner 110 comprises one or more computers 150 at one or more locations including associated input devices 152, output devices 154, non-transitory computer-readable storage media, processors 156, memory, or other components for receiving, processing, storing, and communicating information according to the operation of supply chain network 100. According to embodiments, demand planner 110 comprises retail manager 111, inventory manager 112, internal POS terminal 202, external POS terminal 204, and communication links 210-216. Although a single retail manager 111, a single inventory manager 112, a single internal POS terminal 202, and a single external POS terminal 204 are shown and described, embodiments contemplate any number of retail managers, inventory managers, internal POS terminals, and external POS terminals, according to particular needs. In addition, or as an alternative, although communication links 210-216 are shown as generally coupling retail manager 111, inventory manager 112, internal POS terminal 202, and external POS terminal 204, retail manager 111, inventory manager 112, internal POS terminal 202 and external POS terminal 204 may communicate directly with each other, according to particular needs.

In one embodiment, retail manager 111 comprises server 113 and database 114. According to embodiments, retail manager 120 computes a returns forecast of one or more products at one or more retailers 148. Based, at least in part, on the generated returns forecast, retail manager 111 determines a new price of one or more products, places orders for the one or more products, and adjusts inventory of the one or more products at retailer 148 and/or one or more supply chain entities 140. According to embodiments, retail manager 111 solves the returns forecast faster than conventional systems and generates an accurate estimation of the returns forecast relying on three elements: a historical sales time series, a historical returns time series, and a sales forecast.

Sever 113 of retail manager 111 comprises modeler 220, POS interface module 222, and returns planner 224. Although the server is shown and described as comprising a single modeler 220, a single POS interface module 222, and a single returns planner 224, embodiments contemplate any suitable number or combination of these, according to particular needs. Additionally, modeler 220, POS interface module 222, and returns planner 224 may be located at one or more locations, local to, or remote from, retailer 148 such as on one or more servers or computers, at any location in supply chain network 100.

Modeler 220 of server 113 generates one or more mathematical models relating historical sales, historical returns, and/or a sales forecast, to calculate a returns forecast by determining a transfer function and associated weights, as described in more detail below. Modeler 220 supplies one or more mathematical models that models returns at the store-product level (i.e. Demand Forecasting Unit or DFU). According to some embodiments, the DFU comprises a combination of product, location, time, and/or customer.

Additionally, modeler 220 may store one or more models and associated weights and calculations as modeling data 232 in database 114. POS interface module 222 of server 113 receives transaction data, such as, for example, pricing, sales, and returns data, from POS terminals 202-204 and stores the data as sales and returns data 230 in database 114. According to embodiments, POS interface module 222 may generate a sales time series and a returns time series from the transaction data.

Database 114 of retail manager 111 comprises sales and returns data 230 and modeling data 232. Although, database 114 is shown and described as comprising sales and returns data 230 and modeling data 232, embodiments contemplate any suitable number or combination of these, located at one or more locations local to, or remote from, retailer 148, such as on one or more databases or computers at any location in supply chain network 100.

Sales and returns data 230 of database 114 comprises pricing, sales, and returns data of products for one or more retailers 148 generated by POS terminals 202-204. According to an embodiment, pricing, sales, and returns data is formatted and stored as sales time series and returns time series at specified time intervals, such as, for example, an hour, a day, a week, a month, or any suitable time period, as described in more detail below. Additionally, sales and returns data 230 may comprise the current retail price of one or more products, which may be different for each store operated by retailer 148, including stores at various geographical locations. Modeling data 232 of database 114 may comprise mathematical models of the transfer functions generated by modeler 220 and, additionally, any constraints, weights, computations, or assumptions used in the model.

In one embodiment, inventory manager 112 comprises server 115 and database 116. Server 115 of inventory manager 112 comprises inventory management module 240. According to embodiments, inventory management module 240 is configured to receive and transmit inventory data 250, including item identifiers, pricing data, attribute data, inventory levels, and other like data about one or more items at one or more locations in the supply chain network 100. Additionally, inventory management module 240 may store and retrieve inventory data 250 from database 116 or from one or more locations in supply chain network 100. Although server 115 is shown and described as comprising a single inventory management module 240, embodiments contemplate any suitable number or combination of modules, according to particular needs. Furthermore, inventory management module 240 may be located at one or more locations, local to, or remote from, retailer 148 such as on one or more servers or computers and at any location in supply chain network 100.

Database 116 of inventory manager 112 comprises inventory data 250. Although, database 116 is shown and described as comprising inventory data 250, embodiments contemplate any suitable number or combination of data storage arrangements, located at one or more locations, local to, or remote from, retailer 148, such as on multiple databases or computers and at any location in supply chain network 100.

According to embodiments, inventory data 250 comprises inventory information for products at retailer 148, including one or more of product A, one or more of product B, through one or more of product N. In addition, product A comprises one or more items including a first item, a second item, through an nth item. Likewise, product B comprises one or more items including a first item, a second item, through an nth item and product N comprises one or more items including a first item, a second item, through an nth item. Each of product A, product B, through product N may be sold by retailer 148 using, for example, POS terminals 202-204, an online storefront, or the like. In addition, each of product A, product B, through product N may be supplied by one or more supply chain entities 140 in response to a request from retailer 148. According to an embodiment, inventory data 250 comprises the price, amount, sales, physical location, and other information related to the inventory of each of product A, product B, through product N, according to particular needs.

According to embodiments, inventory data 250 includes current or projected inventory quantities or states, order rules, or explanatory variables. For example, inventory data 250 may comprise the current level of inventory for each item at one or more stocking points across the supply chain network 100. In addition, inventory database 116 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 116 may comprise explanatory variables that describe the data relating to specific past, current, or future indicators and the data of promotions, seasonality, special events (such as sporting events), weather, and the like. According to some embodiments, demand planner 110 accesses and stores inventory data 250 in inventory database 116, which may be used by demand planner 110 to place orders, set inventory levels at one or more stocking points, initiate manufacturing of one or more items, or the like. In addition, or as an alternative, inventory data 250 of inventory database 116 may be updated by receiving current item quantities, mappings, or locations from inventory manager 112, one or more imagers 120, transportation network 130, and/or one or more supply chain entities 140.

POS terminals 202-204 may comprise any device or combination of devices that receives, generates and/or records information regarding the sale or return of one or more items from retailer 148 and/or one or more supply chain entities 140. According to one embodiment, internal POS terminal 202 comprises one or more POS terminals located inside of a retailer 148 store, such as a self-scanning kiosk or a cashier-run terminal, which records a sale or return of one or more items at a retailer 148 store. In another embodiment, external POS terminal 204 comprises one or more POS terminals or systems located at one or more locations, local to, or remote from, retailer 148 and records the sale or return of one or more items of retailer 148, including online sales. In addition, as POS terminals 202-204 monitors the sale or return of each item, POS terminals 202-204 records the transaction data of each item, including, for example, the product, price, the number of items, the customer, the time, and/or other data, as described herein.

Based on the transaction information received by POS terminals 202-204, retail manager 111 forecasts the quantity of a returned item by modeling a transfer function which relates the quantity of returned items based on the quantity of sales of the item. As described below, embodiments contemplate generating a transfer function from sales and returns data 230 of past shopping seasons, adapting the transfer function to the most recent shopping season, or continuously adapting the transfer function (week-by-week) based on current sales and returns.

Figure 3:
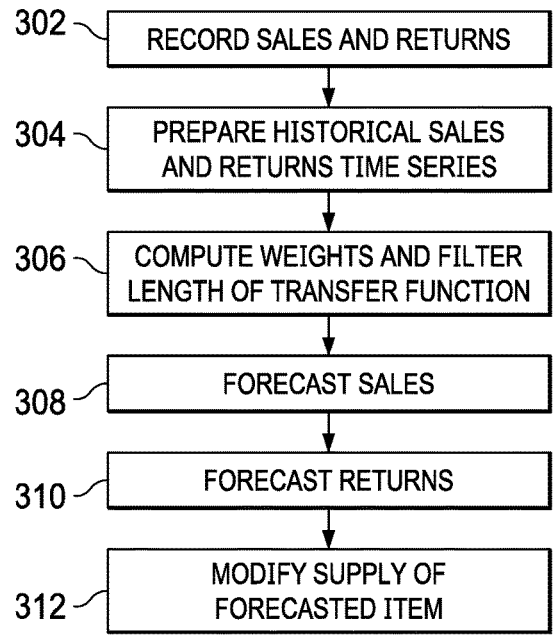
FIG. 3 illustrates a method of returns forecasting, according to an embodiment.

FIG. 3 illustrates method 300 of returns forecasting, according to an embodiment. Method 300 proceeds by one or more activities, which although described in a particular order may be performed in one or more permutations, according to particular needs. At activity 302, POS terminals 202-204 record the transaction data associated with the sales and returns of items at one or more stores of retailer 148. According to some embodiments, transaction data may be recorded automatically by imaging a product or scanning an identifier during sales and returns transactions and recording information associated with the transaction, including, for example, identity of the purchaser or returner, method of payment, quantity of items in the transaction, identity of items bought or returned together, attributes of purchased or returned items, timing of the purchase or return, promotions used for purchase or return, location of purchase or return, transaction price, and the like. Although sales and returns are described as recorded by POS terminals 202-204, embodiments contemplate recording sales and returns transaction information using any suitable device, including, for example, recording sales and returns transactions using input device 152 on one or more databases local to, or remote from, retail manager 111 or inventory manager 112.

At activity 304, retail manager 111 prepares historical sales and returns time series. According to embodiments, preparing historical sales and returns time series comprises processing sales and returns transaction information, retrieving external data associated with the historical sales and returns transaction information, aggregating or segmenting sales and returns data, transforming the sales and returns data to a sales time series and a returns time series, and/or other associated tasks. According to some embodiments, retail manager 111 receives tabulated sales and returns at predetermined periods and stores the tabulated sales and returns as a sales time series and returns time series in sales and returns data 230 in database 114. According to embodiments, a sales time series comprises a sequence of the quantity of unit sold or sales of a particular item over multiple time periods at a specific location, and a returns time series comprises a sequence of the quantity of returns of a particular item over multiple time periods at a specific location. Although the examples below are given using a weekly time period, embodiments contemplate a time period comprising any unit of time suitable for quantifying sales and returns, including, for example, quantifying sales and returns hourly, daily, weekly, bi-weekly, monthly, yearly, and the like.

According to some embodiments, forecasting returns for a particular item at a particular store (the DFU level) comprises a slow-mover problem. Slow movers, which may refer to slow-moving products, items, or inventory, are characterized by demand with low to moderate lumpiness and high intermittence, where lumpiness refers to the unpredictability of the quantity of demand, and intermittence refers to the time between non-zero demands. According to embodiments, slow movers may also refer to the low to moderate lumpiness and high intermittence of returned items. Lumpiness describes the unpredictability of the value of items in a time series. For example, when an observed value is much like one or more previously observed values, the lumpiness is low. When the lumpiness is high, the value of items in the time series varies considerably and/or is unpredictable. Intermittence describes how often a non-zero value is observed. For example, when no time or a short time exists between non-zero values in a time series, the intermittence is low. When the intermittence is high, a long time of zero values will exist between non-zero values.

As described above, slow moving inventory is characterized by sales or returns with low to moderate lumpiness and high intermittence. In particular, a representative time series of slow moving inventory may comprise non-negative integer observations that include a large fraction of zero observations characterized by long runs of zeros interspersed by non-zero values. For example, one or more stores of retailer 148 may receive less than thirty returned items in a week (such as, for example, ten items, five items, less than five items, and the like). Often, however, one or more stores of retailer 148 receive no returned items in a week. According to one embodiment, a slow-moving item comprises an item with less than one sale or return per week. Although examples of a slow-moving item are described, a returns forecast may be generated by the transfer function for fast-moving, medium-moving, and slow-moving items.

The quantity of returns for a given period in a returns time series may be expressed as a function of the quantity of sales of N+1 periods of a sales time series, according to Equation 1:

$$r_n = f(q_n, q_{n-1}, q_{n-2}, q_{n-3}, \ldots, q_{n-N}) \quad (1)$$

where, $r_n$ is the quantity of a particular item returned on the $n^{th}$ period at a specific location, and $q_n$, $q_{n-1}$, $q_{n-2}$, $q_{n-3}$, ..., $q_{n-H}$ are sales quantities for N+1 periods of the sales time series from the sales quantity on the $n^{th}$ period ($q_n$) up to, and including, the sales quantity on N periods before the $n^{th}$ period ($q_{n-N}$). Accordingly, retail manager 111 may estimate the quantity of returns for the $n^{th}$ period of the returns time series as the sum of weighted sales quantities of N+1 periods of the sales time series, according to Equation 2:

$$r_n = \sum_{k=0}^{N} w_k \cdot q_{n-k} \quad (2)$$

where, $r_n$ is the quantity of a particular item returned on the $n^{th}$ period, $q_{n-k}$ is the sales quantity of the item on k periods before the $n^{th}$ period, and $w_k$ is the weight associated with the sales quantity of the item on k periods before the $n^{th}$ period. Using Equation 2, returns are computed as the sum of weighted sales quantities for N previous time periods from $q_n$ up to, and including, $q_{n-k}$, and where the weight $w_k$ is the probability (which may be represented as a percentage) for k periods before the $n^h$ period that the return takes from the sales quantity (when the weight is positive) or that the return gives to the sales quantity (when the weight is negative). For example, if a weight comprises a large positive value and corresponds to a time period of three weeks (i.e. k=3), then retailer 148 would estimate the number of returns will increase in three weeks' time. On the other hand, a weight with a negative value indicates that returns are less likely to occur during the week corresponding with the negative weight.

At activity 306, retail manager 111 computes the weights and filter length N+1 of returns transfer function, which estimates the quantity and timing of returns of an item based on sales. Retail manager 111 may compute the N+1 weights of the transfer function using an adaptive estimation with a normalized least mean square method (nLMS) (the optimal learning rate is not subject to the level of sales), after initializing the N+1 filter coefficients with the historical transfer function ($h_e$), As new returns data is received, the N adaptive filter coefficients ($\vec{w}_n$)

are updated with the vectorized recursive form:

$$\vec{w}_{n+1} = \vec{w}_n + \frac{1}{\vec{q}^T \cdot \vec{q}} \cdot e_n \cdot \vec{q}_n \quad (3)$$

This recursive equation provides the weight as a vector $\vec{w}_{n+1}$ for the time step n+1 from the previous weight $\vec{w}_n$ on time step n. The weight is adjusted based on the error $e_n$ between actual and estimated returns on time step n and the sales quantity history vector $\vec{q}_n$.

The vector dimension of $\vec{w}_n, \vec{w}_{n+1},$ and $\vec{q}_n,$ is based on the filter length N+1 of the transfer function, as expressed in Equation 2, above. Additionally, although embodiments describe updating the transfer function, embodiments contemplate generating a transfer function from a past season of sales and predicting returns for an upcoming season without updating the transfer function.

To compute the filter length of the transfer function, retail manager 111 determines the longest meaningful duration between the time an item is returned and the time it was bought by estimating the returns using at least two filter lengths, measuring the mean square error (MSE) between the estimated returns and the actual returns for each of the filter lengths, and selecting the filter length with the lowest MSE. According to one embodiment, returns planner 224 determines the returns period by estimating returns for each filter length from, for example, five weeks to thirty-two weeks (i.e. N=[5, 6, 7, . . . 30, 31, 32] for a weekly time step), measuring the MSE for each of these filter lengths, and selecting the filter length with the lowest MSE. Although determining the returns period is described as considering each filter length from five to thirty-two weeks for a weekly time step, embodiments contemplate using any suitable number or combination of filter lengths with any suitable length of time step to determine the best filter that transforms sales into returns, according to particular needs.

At activity 308, retail manager 111 computes a sales forecast. According to embodiments, method 300 is agnostic to the process of computing the sales forecast, which may be performed by any suitable process that generates a sales forecast for the item including, for example, a Holt-Winters or a probabilistic forecast. According to embodiments the transfer function can be applied to a probabilistic forecast of demand to generate a probabilistic forecast of returns, which may be a linear combination of the probabilistic forecast of demand.

At activity 310, retail manager 111 computes a returns forecast. According to embodiments, after retail manager 111 computes the sales forecast and determines the transfer function, retail manager 111 computes the returns forecast by applying the transfer function to the sales forecast. As described in more detail below, forecasting returns may be based on a cycle of sales, and forecast for an entire shopper population or only a segment of these shoppers.

At activity 312, based, at least in part, on the forecasted sales and returns, retail manager then causes one or more supply chain entities to produce, supply, hold, and/or limit supply to an amount of items equal to the calculated future sales of the items minus any on-hand inventory and any resalable returned items at one or more retailers.

Figure 4:
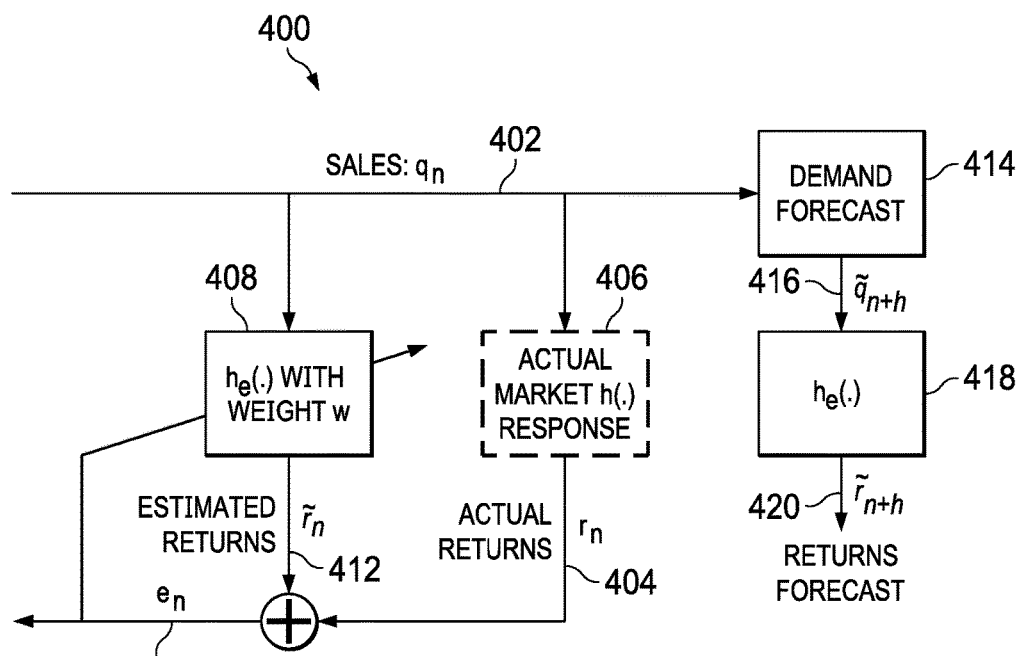
FIG. 4 illustrates a block diagram representing estimating the returns transfer function using a normalized Least Mean Square (nLMS) filter and applying it to a sales forecast to generate a returns forecast.

FIG. 4 illustrates a block diagram 400 representing estimating the returns transfer function using a nLMS filter and applying it to a sales forecast to generate a returns forecast. According to embodiments, the returns transfer function is estimated from two inputs: actual sales $q_n$ 402 and actual returns $r_n$ 404. The actual market response h 406 is an unknown function that is estimated by returns planner 224. Although actual market response 406 usually cannot be known beforehand, returns planner 224 approximates the actual market response 406 with returns transfer function $h_e$, represented by adaptive filter 408 from historical sales and returns data. Returns transfer function comprises weights w, which are computed by returns planner 224. According to embodiments, returns planner 224 computes weights by minimizing the error $e_n$ 410 between the estimated returns $\tilde{r}_n$ 412 and the actual returns $r_n$ 404 using a normalized least mean square method.

Returns planner 224 uses demand forecast 414 and historical sales 402 up to time step n to calculate sales forecast $\tilde{q}_{n+h}$ 416 up to time step n+h or h periods further in the future. Once the returns transfer function and sales forecast 416 are known, returns planner 224 uses the returns transfer function to compute returns forecast $\tilde{r}_{n+h}$ 420 from the N+1 prior sales forecast 416 (represented by box 418).

As each new time step for actual sales and actual returns are received, returns planner 224 may update returns transfer function be more accurate by refining the value of the weights of the returns transfer function. With each time step that is processed, the weights become more refined to more accurately predict returns forecast 420 from sales forecast 416, based on error 410, where the larger the value of error 410, the larger the adjustment to the new weight of the returns transfer function.

For example, as new sales and returns are processed by a POS terminal 202-204 and tabulated by POS interface 222, returns planner 224 computes error 410 between what the returns transfer function predicted for that time step and the actual level that was measured by the market. Then, based on error 410 that is computed, returns planner 224 derives the weights of the returns transfer function. As the value of error 410 increases, the weights will change more quickly. As the value of error 410 starts to temper, the weights begin converging and will change less and less for each time step.

Figure 5:
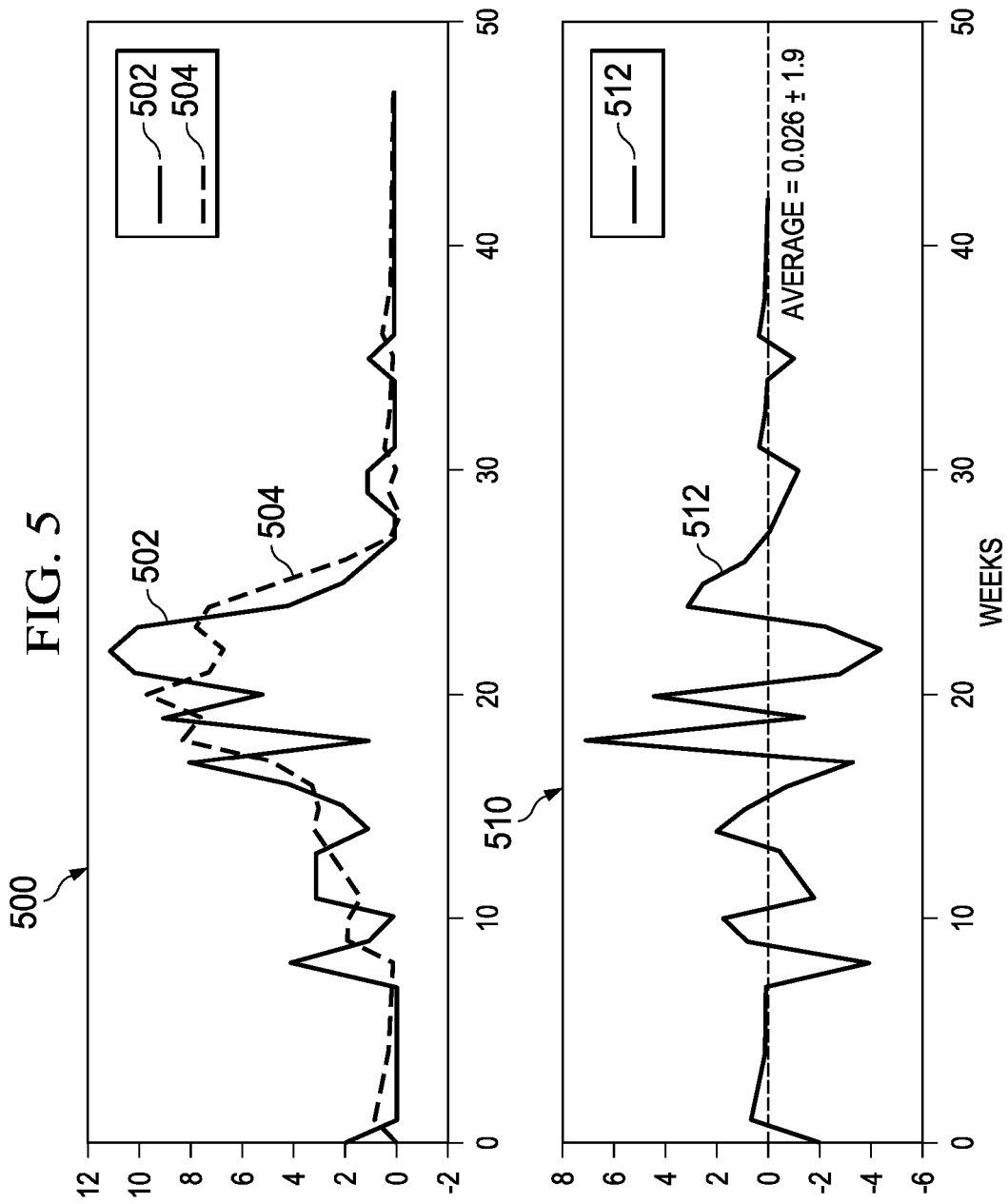
FIG. 5 illustrates the refinement of the estimation of actual market response by the returns transfer function.

FIG. 5 illustrates the refinement of the estimation of actual market response 406 by the returns transfer function. Top plot 500 illustrates actual returns 502 and estimated returns 504 for an increasing number of weeks (each week representing one time step). As illustrated, estimated returns 504 more accurately estimates actual returns 502 with an increasing number of forecasts. This is corroborated by bottom plot 510, which illustrates the error 512 between actual returns 502 and estimated returns 504 decreases with an increasing number of weekly forecasts.

As discussed above, the number of weights in the returns transfer function varies based, at least in part, on the filter length or the number of previous sales times steps used to estimate returns. For example, where the length of a time step corresponds to one week and five weeks of past sales are used to estimate the number of weekly returns, then the returns transfer function will comprise five weights. Continuing with this example, to estimate returns for week 2 of the calendar year (i.e. the second week of January), returns planner 222 may use the weighted sales of the five previous weeks, such as, for example, 5% week 1+5% week 52 (prior calendar year)+30% week 51 (prior calendar year)+50% week 50 (prior calendar year)+10% week 49 (prior calendar year). Although a particular example is given, returns may be estimated based on the combination of a percentage of sales from any current or prior time period.

According to embodiments, the pattern of returns may be relative to the pattern of sales, and aligned to the sales calendar year and seasonal sales based on the pattern of sales. For example, regardless of the calendar period, the returns comprise the same linear combination of the past few weeks. For seasonal sales, such as, for example, Christmas sales, returns may be estimated from the sales of prior weeks as illustrated by the previous example.

Notably, the length of time between the sale and return of an item may vary greatly based on several factors, including, a return policy, the particular industry, the particular store, and the like. For example, returns planner 224 may adjust the transfer model based, at least in part, on the return policy of retailer 148—although retailers 148 with more permissive returns policies are often more likely to receive a higher quantity of returns, some retailers 148 with more permissive returns policies have less returns (and higher sales) because a more permissive returns policy may lead to greater customer satisfaction.

According to some embodiments, returns planner 224 determines the returns period by estimating the returns using at least two filter lengths, measuring the mean square error (MSE) between the estimated returns and the actual returns for each of the filter lengths, and selecting the filter length with the lowest MSE. According to embodiments, returns planner 224 determines the length of the filter by estimating returns for different filter lengths from five weeks to thirty-two weeks, measuring the MSE for each of these filter lengths, and selecting the filter length with the lowest MSE. Although determination of the best filter length is described as considering each filter length from five to thirty-two weeks, embodiments contemplate using any number or combination of filter lengths. According to embodiments, the filter length is estimated each time the transfer function is estimated. For example, returns planner 224 estimates the weight for a filter of length 5 and stores its MSE for the length of the season or a predefined number of weeks. Returns planner 224 may then estimate the weight for a filter of length 6 and store its MSE. After each filter length is estimated and the resulting MSE is stored, returns planner 224 compares the MSE and selects the filter length with the lowest MSE. Once, this filter length is defined, returns planner 224 may further adapt the filter coefficients or lock them in.

Additionally, for seasonal items, such as, for example, items that are not sold for a one or more sales periods during a year, it is critical to start the estimation of this filter on the time when the season has its first sales and to end it after the last season returns. According to embodiments, the first sales are determined as the week with the first sales in the year, and the last season return is determined as the week with the last non-zero return, which is after the last season sales. For non-seasonal items, a fixed filter length, such as, for example, 10 weeks, may be used.

As mentioned above, although method 300 describes updating the returns transfer function, embodiments contemplate generating a transfer function from a past season of sales and then predicting returns for an upcoming season without updating the transfer function.

Figure 6:
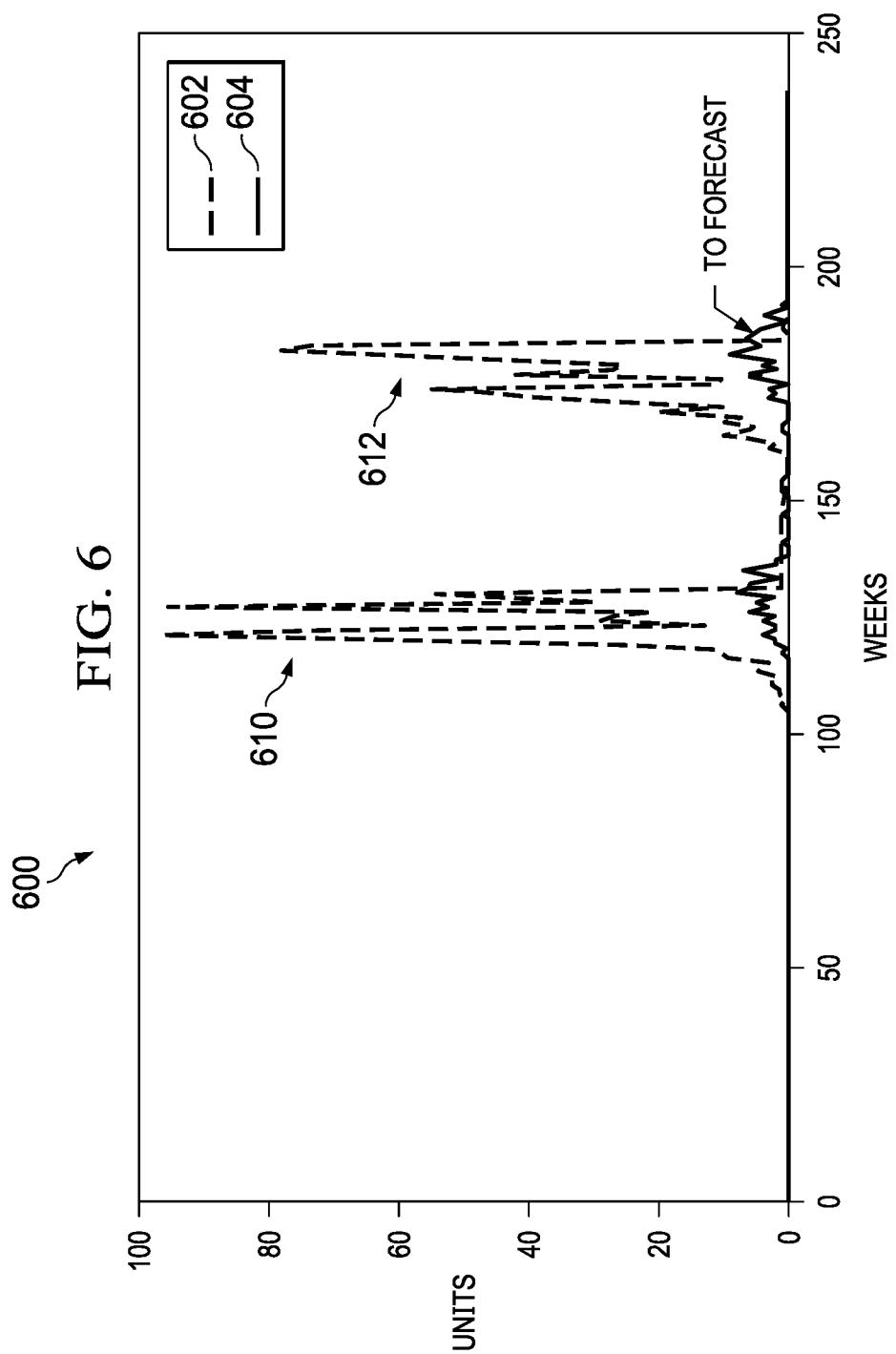
FIG. 6 illustrates a chart comprising the sales and returns for two sales seasons, according to an embodiment.

FIG. 6 illustrates chart 600 comprising the sales and returns for two seasons, according to an embodiment. Chart 600 comprises actual sales time series 602 and actual returns time series 604. Actual sales time series 602 comprises the recorded sales of an item in units over the course of many weeks. Actual returns time series 604 comprises the recorded returns of an item in units over the course of the same time period.

Actual sales time series 602 and actual returns time series 604 comprise first season 610 and second season 612. First season 610 comprises a first set of peaks representing an increase in sales and returns during a first year, and second season 612 comprises a second set of peaks representing an increase in sales and returns during a second year. As can be seen, the pattern of sales and returns for the exemplary item is similar for first season 610 and second season 612, including the approximate ratio between sales and returns and the timing between the sale of an item and the return of the item, indicated by the earlier rise of sales compared to the corresponding delayed rise of returns. According to some embodiments, first season 610 comprises a training sequence, and second season 612 comprises a test period. For example, retail manager 111 may compute a transfer function based on the sales and returns of the first season 610 and use the transfer function to estimate a returns forecast for the second season 612. According to this example, retail manager 111 estimates a single transfer function based on sales and returns of first season 610. The single transfer function is used to forecast returns for second season 612. However, according to some embodiments, the weights of the transfer function may be updated periodically as new sales and returns data is received (such as weekly, daily, monthly, or any other time period).

As discussed above, retail manager 111 may according to some embodiments generate a returns forecast based on sales and returns data 230 that is sorted at the DFU level. The method works item-by-item, and looks at, on aggregate, all the sales and returns that are coming into a particular store for a particular item. However, embodiments contemplate aggregating or segmenting sales and returns data according to items, stores, customers, time, and the like. For example, retail manager 111 may modify the level of hierarchy or the number of segments to aggregate or segment sales and returns data to generate more accurate returns forecast.

According to embodiments, returns planner 224 aggregates products to calculate a more accurate returns forecast. Although forecasting for sales and returns is described at the DFU level or SKU-store level, embodiments contemplate aggregating sales or returns forecasting to any level of aggregation for any hierarchy of products, customers, time, or geographies. According to embodiments, when the quantity of sales and/or returns for an item are too low, returns planner 224 aggregates the sales and/or returns of various items to create more accurate returns forecasts. To generate a forecast at a more aggregated level, retail manager 111 may combine sales and returns data 230 for products from different stores, longer time periods, and aggregation levels of a product hierarchy.

Returns planner 224 may aggregate products based, at least in part, on a product hierarchy. Each item sold by retailer 148 comprises various attributes that describe properties of the item. A product hierarchy comprises various levels of product aggregation based on product attributes of the one or more items sold by retailer 148. For the exemplary clothing item, the attributes may comprise, for example, size, color, article, family, style, collection, market, brand, and the like. For example, a particular shirt may be sold by a clothing retailer in various colors (red, blue, green, or the like) or sizes (small, medium, large, or the like). Food sold by a grocery retailer may be available in different flavors (such as varieties of pasta sauce) or different sizes (such as two liter bottles of soda or sixteen ounce bottles of soda). Although attributes are described in connection with clothing items and food items, embodiments contemplate any appropriate attributes to describe any retail item, according to particular needs.

To further illustrate product aggregation according to an embodiment, an example is now given. A product, such as a shirt, represented by a single SKU may be sold at a particular store of retailer 148. The most granular view of sales and returns of this shirt is represented by the SKU-store level. However, when sales of a product are too low to generate an accurate sales or returns forecast, retail manager 111 may aggregate products to improve the sales or returns forecast. According to an embodiments, retail manager 111 may aggregate beginning at lower levels of the hierarchy and moving up, such as, for example, aggregating according to colors and sizes first, before aggregating at higher levels of aggregation, such as market and brands. Additionally, retail manager 111 may aggregate products by using the sales and returns data for the same product from other stores, such as, for example, other stores in the same city that use the same pricing model or same marketing strategy.

In addition to aggregation, retail manager may improve sales and returns forecasts using customer segmentation. By segmenting customers, returns forecasts may more accurately predict actual future returns by identifying repeatable shopper behavior that influences a shopper's likelihood to return an item. For example, by using transactional sales and returns data, shoppers may be identified and sorted into segments based on their purchase and/or returns behavior. Customers return items for a variety of reasons including, for example, poorly fitting clothing, defective items, unexpected qualities, dissatisfaction, and the like. Additionally, online sales often experience a greater number of returns than brick-and-mortar stores because customers typically cannot sample items prior to purchase. Therefore, customers of online retailers may buy an item in a variety of flavors, styles, or sizes, try each of them, and return the ones that are unsuitable. For example, shoppers who order multiple shoe sizes to ensure a perfect fit may be identified and segmented according to their return behavior. Because each customer segment may exhibit a different behavior in returning items, aspects of the current disclosure generate a transfer function that chooses several past sales based on a customer segment, and predicts the timing and quantity of returned items based on the forecasted sales and transfer function associated with that particular customer segment. In addition, segmentation may not be limited to just customers, but may include brick-and-mortar versus online stores, the category, type, or attributes of products, locations of sales and returns, the identity of the store associated with the forecast, and the like.

FIG. 7 illustrates chart 700 of four exemplary shopper segments, segmented according to the number of successive sizes per order. Chart 700 comprises four customer segments: Segment A 902, comprising customers who purchased items in only one size, Segment B 904, comprising customers who purchased items in two successive sizes, Segment C 906, comprising customers who purchased items in three successive sizes, and Segment D 908, comprising customers who purchased items in four successive sizes. As discussed above, some customers will order various sizes of a product with the intention of returning one or more of the sizes because the customer is unsure of the fit of the product or is unsure about which of a variety of colors or styles the customer would like to keep. By segmenting these shoppers, returns manager 224 may compute more accurate returns forecasts, as described in method 300, because customers in the same segment are likely to exhibit similar behavior for returning items based on the customer's tendency to purchase multiple successive sizes. By generating a returns forecast for various segments, returns manager 224 may generate a more granular and accurate forecast of returns for each of the segments. Although this example segments customers by ordering of successive sizes, embodiments contemplate segmenting customers by any suitable customer characteristic or attributes of purchased products, including, for example, customer behaviors, ordering more than one item that is different in only a few attributes (e.g. ordering the same article of clothing in different colors, textures, sizes, or the like), and the like. According to embodiments, the segmentation of customers leads to better predictions of the quantity and timing of returns.

According to some embodiments, returns planner 224 may consider the identity of the purchaser when generating a returns forecast, because some customers have a much higher propensity to return items than other customers. Although this may be dealt with in some respect with customer segmentation, embodiments contemplate identifying customers with a higher rate of returns to more accurately predict item returns.

According to some embodiments, returns planner 224 discriminates returns by segmentation, such as good quality returns that can be sold as it, returns that needs minor changes to be sold, returns that needs to go to a third market, and returns that need to be discarded. According to other embodiments, returns may be distributed in any suitable manner, such as resold, recycled, redistributed, refurbished, repackaged, or any other like distribution.

According to embodiments, retailer 148 may determine whether returns are resalable, either before or after the product is returned. For example, a grocery retailer may classify items as food and non-food items without evaluating each returned item individually. The grocery retailer may implement a blanket policy that all food items may need to be discarded when they are returned, and non-food items may be resold—either by the same grocery retailer or sent to another distributor or retail location. On the other hand, a clothing retailer may need to have a process to evaluate returned items after they are returned to a retail location so that their resalability can be determined. For example, the clothing retailer may need to inspect the item for damage, determine if the item is still "in-season," or other determinations. The clothing retailer may then determine if the item should be resold at the same store (whether at the original price or a discount), be sent to another retail location (such as a discount retailer), be recycled, discarded, or any other suitable distribution.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for returns forecasting for a retail store inventory of one or more supply chain entities, comprising:
   receiving, by a computer, a current state of items in a supply chain network comprising one or more supply chain entities, wherein an inventory of the one or more supply chain entities is used to store one or more items, and a state of the items comprises a quantity and ordered flow among the inventory of the one or more supply chain entities;
   receiving, by the computer, a sales time series and a returns time series, the sales time series comprising a sequence of sales quantities of a particular product for at least two steps and a returns time series comprising a sequence of returns quantities of the particular product for at least two time steps;
   computing, by the computer, a returns forecast comprising an expected quantity of the particular product to be returned for a future time period, the returns forecast computed using a sales forecast and a transfer function, the transfer function estimated from the sales time series and the returns time series and comprising one or more weights, each of the one or more weights associated with a time period and comprising a probability that the particular product will be returned during the associated time period;
   transporting, by a transportation network, at least one item of the particular product based, at least in part, on the sales forecast and the returns forecast.

2. The computer-implemented method of claim 1, further comprising:
   recording, by a point of sale system, one or more transactions of one or more items of the particular product by scanning an identifier associated with each of the one or more items and identifying the particular product based, at least in part, on the scan;
   tabulating, by the computer, the one or more transactions of the one or more items of the particular product; and
   generating, by the computer, the sales time series and the returns time series based, at least in part, on the tabulated one or more transactions.

3. The computer-implemented method of claim 2, wherein the one or more transactions comprise one or more of a sales transaction and a returns transaction.

4. The computer-implemented method of claim 3, wherein the computer computes the weights of the transfer function by minimizing the error between an estimated returns quantity and an actual returns quantity using a normalized least mean square method.

5. The computer-implemented method of claim 4, further comprising:
   updating, by the computer, the weights of the transfer function by computing an error between a quantity of items of the particular product predicted by the transfer function for a time step and the actual quantity of items returned.

6. The computer-implemented method of claim 5, wherein the returns forecast comprises an expected quantity of returned items from a customer segment, the customer segment identified based, at least in part, on a customer behavior the influences the likelihood of a customer in the customer segment to return an item at a particular location.

7. The computer-implemented method of claim 6, wherein the returns time series comprises an aggregation of a quantity of returned items from a second product.

8. A system of returns forecasting for a retail store inventory of one or more supply chain entities, comprising:
　a computer, comprising a processor and a memory, and configured to:
　　receive a current state of items in a supply chain network comprising one or more supply chain entities, wherein an inventory of the one or more supply chain entities is used to store one or more items, and a state of the items comprises a quantity and ordered flow among the inventory of the one or more supply chain entities;
　　receive a sales time series and a returns time series, the sales time series comprising a sequence of sales quantities of a particular product for at least two steps and a returns time series comprising a sequence of returns quantities of the particular product for at least two time steps; and
　　compute a returns forecast comprising an expected quantity of the particular product to be returned for a future time period, the returns forecast computed using a sales forecast and a transfer function, the transfer function estimated from the sales time series and the returns time series and comprising one or more weights, each of the one or more weights associated with a time period and comprising a probability that the particular product will be returned during the associated time period; and
　a transportation network, wherein the transportation network transports at least one item of the particular product based, at least in part, on the sales forecast and the returns forecast.

9. The system of claim 8, further comprising:
　a point of sale system, wherein the point of sale system records one or more transactions of one or more items of the particular product by scanning an identifier associated with each of the one or more items and identifying the particular product based, at least in part, on the scan.

10. The system of claim 9, wherein the computer is further configured to:
　tabulate the one or more transactions of the one or more items of the particular product; and
　generate the sales time series and the returns time series based, at least in part, on the tabulated one or more transactions.

11. The system of claim 10, wherein the one or more transactions comprise one or more of a sales transaction and a returns transaction.

12. The system of claim 11, wherein the computer computes the weights of the transfer function by minimizing the error between an estimated returns quantity and an actual returns quantity using a normalized least mean square method.

13. The system of claim 12, wherein the computer is further configured to:
　update the weights of the transfer function by computing an error between a quantity of items of the particular product predicted by the transfer function for a time step and the actual quantity of items returned.

14. The system of claim 13, wherein the returns forecast comprises an expected quantity of returned items from a customer segment, the customer segment identified based, at least in part, on a customer behavior the influences the likelihood of a customer in the customer segment to return an item at a particular location.

15. A non-transitory computer-readable medium embodied with software, the software when executed configured to forecast returns for a retail store inventory of one or more supply chain entities by:
　receiving a current state of items in a supply chain network comprising one or more supply chain entities, wherein an inventory of the one or more supply chain entities is used to store one or more items, and a state of the items comprises a quantity and ordered flow among the inventory of the one or more supply chain entities;
　receiving a sales time series and a returns time series, the sales time series comprising a sequence of sales quantities of a particular product for at least two steps and a returns time series comprising a sequence of returns quantities of the particular product for at least two time steps;
　computing a returns forecast comprising an expected quantity of the particular product to be returned for a future time period, the returns forecast computed using a sales forecast and a transfer function, the transfer function estimated from the sales time series and the returns time series and comprising one or more weights, each of the one or more weights associated with a time period and comprising a probability that the particular product will be returned during the associated time period; and
　initiating the transport by a transportation network of at least one item of the particular product based, at least in part, on the sales forecast and the returns forecast.

16. The non-transitory computer-readable medium of claim 15, wherein the software when executed is further configured to:
　record one or more transactions of one or more items of the particular product by identifying the particular product based, at least in part, on a scan of an identifier associated with each of the one or more items.

17. The non-transitory computer-readable medium of claim 16, wherein the software when executed is further configured to:
　tabulate the one or more transactions of the one or more items of the particular product; and
　generate the sales time series and the returns time series based, at least in part, on the tabulated one or more transactions.

18. The non-transitory computer-readable medium of claim 17, wherein the one or more transactions comprise one or more of a sales transaction and a returns transaction.

19. The non-transitory computer-readable medium of claim 18, wherein computing the weights of the transfer function o minimizing the error between an estimated returns quantity and an actual returns quantity using a normalized least mean square method.

20. The non-transitory computer-readable medium of claim 19, wherein the software is further configured to:
update the weights of the transfer function by computing an error between a quantity of items of the particular product predicted by the transfer function for a time step and the actual quantity of items returned.

* * * * *